US012768217B2

(12) United States Patent
Willie et al.

(10) Patent No.: US 12,768,217 B2
(45) Date of Patent: Oct. 20, 2026

(54) DOOR ASSEMBLIES AND METHODS OF INSTALLING THE SAME

(71) Applicants: LockNet LLC, Nicholasville, KY (US); Overly Door Company, Greensburg, PA (US)

(72) Inventors: Zachary Willie, Nicholasville, KY (US); Jeff Jasper, Lancaster, KY (US); Bill Hugus, Latrobe, PA (US); Jim Conaway, Mount Pleasant, PA (US)

(73) Assignees: LockNet LLC, Nicholasville, KY (US); Overly Door Company, Greensburg, PA (US)

( * ) Notice: Subject to any disclaimer, the term of this patent is extended or adjusted under 35 U.S.C. 154(b) by 161 days.

(21) Appl. No.: 18/818,097

(22) Filed: Aug. 28, 2024

(65) Prior Publication Data

US 2026/0062984 A1 Mar. 5, 2026

(51) Int. Cl.
*E06B 5/10* (2006.01)
*E06B 5/20* (2006.01)

(52) U.S. Cl.
CPC . *E06B 5/10* (2013.01); *E06B 5/20* (2013.01)

(58) Field of Classification Search
CPC ..................................... E06B 1/70; E06B 5/20
USPC ............................................................ 52/210
See application file for complete search history.

(56) References Cited

U.S. PATENT DOCUMENTS

| | | | | |
|---|---|---|---|---|
| 1,649,807 | A | 11/1927 | Brooks | |
| 4,055,917 | A * | 11/1977 | Coller | E06B 7/2309 49/469 |
| 5,029,911 | A | 7/1991 | Daniels | |
| 5,207,026 | A * | 5/1993 | Bozeman, Jr. | E05C 19/004 49/467 |
| 5,542,217 | A | 8/1996 | Larivee, Jr. | |
| 5,588,266 | A * | 12/1996 | Headrick | E06B 1/70 49/467 |
| 5,611,173 | A * | 3/1997 | Headrick | E06B 1/70 49/467 |
| 9,920,567 | B2 * | 3/2018 | Jetton | E06B 7/16 |
| 10,494,857 | B2 * | 12/2019 | Meeks | E06B 1/70 |
| 2003/0005644 | A1 * | 1/2003 | Reithmeyer | E05D 7/0027 49/467 |
| 2005/0173934 | A1 | 8/2005 | Neuman | |
| 2012/0174492 | A1 | 7/2012 | Kibbel | |
| 2013/0305610 | A1 * | 11/2013 | Meeks | E06B 7/2316 49/471 |

(Continued)

*Primary Examiner* — Paola Agudelo

(74) *Attorney, Agent, or Firm* — Dinsmore & Shohl LLP

(57) ABSTRACT

The present disclosure is directed to door assemblies in SCIF and RF applications and methods of installing the same. The door assembly includes a frame assembly with two jambs and a frame header. Each jamb defines at least a central jacking block notch and outer jacking block notch. The door assembly further includes a plurality of jacking blocks, with a jamb side and a door side opposite the jamb side. The jamb side of each jacking block is received within each of the notches. The door assembly further includes a temporary spreader bar coupled to the door side of each jacking block, a threshold, and a seal retainer cover disposed above the threshold along a vertical axis. The threshold is partially disposed below the seal retainer cover such that the seal retainer cover and the plurality of jacking blocks restrict lateral movement of the threshold.

20 Claims, 8 Drawing Sheets

(56) References Cited

U.S. PATENT DOCUMENTS

| | | | | |
|---|---|---|---|---|
| 2014/0312634 | A1* | 10/2014 | Cushwa, Jr. | E06B 9/02<br>292/340 |
| 2023/0407699 | A1* | 12/2023 | Kendall | E06B 3/9632 |

* cited by examiner

DOOR ASSEMBLIES AND METHODS OF INSTALLING THE SAME

TECHNICAL FIELD

The present disclosure relates to door assemblies and methods of installing the same, and, more specifically, to door assemblies that are certified and accredited to be within a sensitive compartmented information facility (SCIF) or used as a radio frequency (RF) barrier.

BACKGROUND

Door installations for SCIF, RF, and similar applications where sound deadening is of paramount importance can take a relatively long time to install (around 6-8 hours per door). One problem associated with such door installations is the movement of the threshold during installation, which is currently addressed by field cutting, shimming, and added accessory materials installed at the site of the installation. Additionally, the bottom stretcher bar that is conventionally used to stabilize the threshold during shipping does not eliminate threshold instability. Thus, a door assembly that minimizes or eliminates the aforementioned problems during the shipping and installation of the door may be desirable.

SUMMARY

In an embodiment, a door assembly comprises a frame assembly including two jambs and a frame header. Each jamb includes a top end and a bottom end, wherein the frame header is coupled to the two jambs at each of the top ends thereof, and wherein each jamb defines at least a central jacking block notch and outer jacking block notch at each of the bottom ends. The frame assembly also includes a plurality of jacking blocks, each jacking block having a jamb side and a door side opposite the jamb side. The jamb side of each jacking block is received within each of the central and outer jacking block notches. The frame assembly also includes a temporary spreader bar coupled to the door side of each jacking block, a seal retainer cover removably coupled to one of the jambs, and a threshold defining a thickness, wherein the threshold is partially disposed below the seal retainer cover along a vertical axis. The frame assembly further includes a door hingedly coupled to one of the jambs, wherein the seal retainer cover is removably coupled to the frame assembly such that the seal retainer cover and the plurality of jacking blocks restrict a lateral movement of the threshold, and wherein the threshold and frame assembly form a sound-proof seal around a perimeter of the door when the door is closed.

In another embodiment, a door assembly comprises a frame assembly including two jambs and a frame header. Each jamb includes a top end and a bottom end, wherein the frame header is coupled to the two jambs at each of the top ends thereof, and wherein each jamb defines at least a central jacking block notch and outer jacking block notch at each of the bottom ends. The frame assembly also includes a plurality of jacking blocks, wherein each jacking block includes a jamb side and a door side opposite the jamb side, wherein the jamb side of each jacking block is received within each of the notches. The frame assembly also includes a temporary spreader bar coupled to the door side of each jacking block, a seal retainer cover removably coupled to one of the jambs and a threshold defining a thickness, wherein the threshold is partially disposed below the seal retainer cover along a vertical axis. The frame assembly further includes a door hingedly coupled to one of the jambs, wherein the seal retainer cover is removably coupled to the frame assembly such that the seal retainer cover and the plurality of jacking blocks restrict a lateral movement of the threshold, and wherein each jamb is grounded via a cable coupled to the jamb, wherein the threshold and frame assembly form a sound-proof seal around a perimeter of the door when the door is closed. The door assembly shields an enclosure from radio frequency interference when the door is closed and the door is disposed on the enclosure to allow ingress and egress from the enclosure.

In another embodiment, a method of installing a sound-proof door assembly. The method includes positioning a frame assembly within a rough opening of a wall, the frame assembly including two jambs each having a top end and a bottom end; a frame header, wherein the frame header is coupled to the two jambs at each of the top ends thereof, and wherein each jamb defines at least a central jacking block notch and an outer jacking block notch at each of the bottom ends; aligning a plurality of jacking blocks coupled to a temporary spreader bar with the notches of each jamb, each jacking block comprising: a jamb side; and a door side opposite the jamb side, wherein the jamb side of each jacking block is received within each of the notches; removing the temporary spreader bar from each jacking block; installing a threshold in place of the temporary spreader bar; coupling a seal retainer cover to the frame assembly such that the threshold is partially disposed below the seal retainer cover along a vertical axis such that the seal retainer cover and the plurality of jacking blocks restrict a lateral movement of the threshold; securing the frame assembly to the wall by a fastening means; removing the seal retainer cover; and hingedly coupling a door to one of the jambs.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The following detailed description of specific embodiments of the present disclosure can be best understood when read in conjunction with the following drawings, where like structure is indicated with like reference numerals and wherein.

Figure 1:
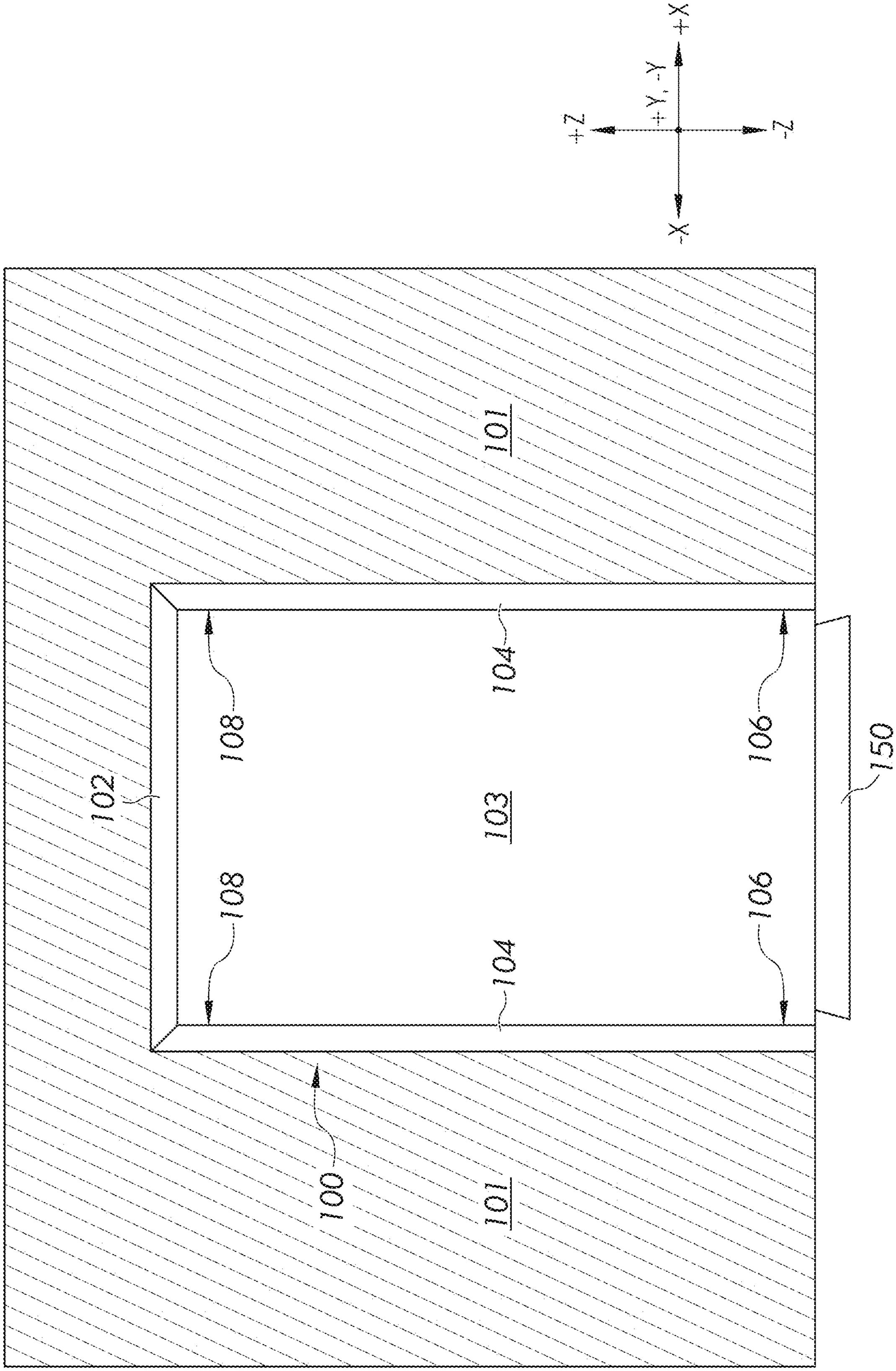
FIG. 1 depicts a plan view of an illustrative frame assembly coupled to a wall within a rough opening of the wall, according to one or more embodiments shown and described herein.

Additional features and advantages of the present disclosure will be set forth in the detailed description, which follows, and will be apparent to those skilled in the art from that description or recognized by practicing the embodiments described herein, including the detailed description, which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

DETAILED DESCRIPTION

Reference will now be made in detail to various embodiments of devices, assemblies, and methods, examples of which are illustrated in the accompanying drawings. Whenever possible, the same reference numerals will be used throughout the drawings to refer to the same or like parts. The present disclosure generally relates to a door assembly and methods of installing the same. The door assembly includes a frame assembly with two jambs, and a frame header. Each jamb defines at least a central jacking block notch and outer jacking block notch at each of the bottom ends. The door assembly further includes a plurality of jacking blocks, and each jacking block comprises a jamb side and a door side opposite the jamb side. The jamb side of each jacking block is received within each of the central jacking block notches. A temporary spreader bar is coupled to the door side of each jacking block and a seal retainer cover is disposed above a threshold in a vertical direction. The threshold of the frame assembly has a thickness and is partially disposed below the seal retainer cover along the vertical or Z axis, between the seal retainer cover and the floor. The seal retainer cover is removably coupled to the frame assembly such that the seal retainer cover and the plurality of jacking blocks restrict a lateral movement of the threshold. Accordingly, this restriction of movement provides time and cost saving measures during installation.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

It is also noted that recitations herein of "at least one" component, element, etc., should not be used to create an inference that the alternative use of the articles "a" or "an" should be limited to a single component, element, etc.

As used herein, the terms "sensitive compartmented information facility" or "SCIF" refer to an area, room, group of rooms, buildings, or installation certified and accredited as meeting Director of National Intelligence security standards for the processing, storage, and/or discussion of sensitive compartmented information (SCI).

As used herein, the term "SCIF door" refers to a door designed to control access to a SCIF, which is a facility used for handling classified or sensitive information, typically by government agencies or contractors. SCIF doors are constructed with materials and features that provide exceptional security, including soundproofing, electromagnetic shielding, and protection against physical intrusion.

As used herein, the terms "radio frequency door," "RF door," or "RF shielding" refer to a type of door which is capable of shielding electromagnetic signals from passing through it. These doors are commonly used in environments where radio frequency interference must be controlled, such as in sensitive government facilities, laboratories, or areas where classified information is handled. RF doors are constructed with materials that effectively block or attenuate electromagnetic waves, thus maintaining the integrity of the electromagnetic environment within a controlled space.

Referring to FIG. 1, a frame assembly 100 is coupled to a wall 101 within a rough opening 103 of the wall 101. The frame assembly 100 includes two jambs 104 and a frame header 102. Each jamb 104 includes a top end 108 of the jamb 104 and a bottom end 106 of the jamb 104. The frame header 102 is coupled to the two jambs 104 at each of the top end 108 of the jambs 104 thereof.

In embodiments, the jambs 104 and frame header 102 may be made from the same material. For example, the jambs 104 and frame header 102 may be steel, metal, or any suitable material capable of providing desired characteristics for the door assembly (e.g., RF, SCIF, etc.). The thickness of the jambs 104 and frame header 102 may be any suitable thickness for the application.

In embodiments, the frame assembly 100 may be coupled to the wall 101 by a fastening means such as, for example, screws or nails. These fastening means may be driven through the frame assembly 100 and into the wall, such as into studs or blocks (not shown).

Still referring to FIG. 1, the frame assembly 100 may further include a threshold 150 along a floor between the jambs 104 near the bottom ends 106 thereof. The threshold 150 is a device typically designed to prevent drafts, moisture, or debris from crossing the boundary between the interior and exterior spaces of the wall 101 when a door is closed within the frame assembly 100. When used in SCIF and RF applications, the prevention of sound and electromagnetic waves from crossing the boundary between the interior and exterior spaces of the wall 101 is heightened.

A threshold in a soundproof door effectively blocks sound by creating an airtight seal between the bottom of the door and the floor, preventing sound waves from passing through. This seal is typically achieved using materials like rubber, silicone, and the like that can compress to fill any gaps, ensuring that there are no spaces for sound to leak through. Additionally, the threshold can include multiple layers or specialized acoustic materials that further dampen and absorb sound vibrations. A threshold that blocks electromagnetic waves typically includes conductive materials, such as metals, which can reflect and absorb these waves, preventing them from passing through. This may be achieved by integrating a continuous strip of metal or a conductive gasket into the threshold, ensuring it forms a complete seal with the door and frame. The conductive materials interact with the electromagnetic waves, reflecting and scattering them, while also providing grounding to dissipate any absorbed energy. A threshold may combine features of soundproofing and RF shielding.

One problem that may occur in conventional door frame assemblies is an uneven installation of the frame when the floor conditions below the frame are not level. This may be caused by the placement of jamb legs on an existing, non-level floor. These problems may lead to shimming. Shims are thin wedges typically made of wood or plastic that can be inserted between the frame assembly and the threshold to fill any gaps and provide additional support. Once the frame assembly is securely attached to the wall and the threshold in place, the excess shims may be cut or trimmed. The shimming and associated cutting thereof may be a time-consuming process. Moreover, another issue that arises is the need to custom cut the seal retainer and seal retainer cover to meet specific installation conditions. This is caused by the threshold being allowed to be set within a range of locations within the jamb opening, requiring site specific measurements and cuts to be made and leading to a time consuming process. Thus, a frame assembly that can ensure an optimal seal between the door and the frame, reduce installation time, reduce the necessary tools, and create a safer installation process may be desired.

Figure 2:
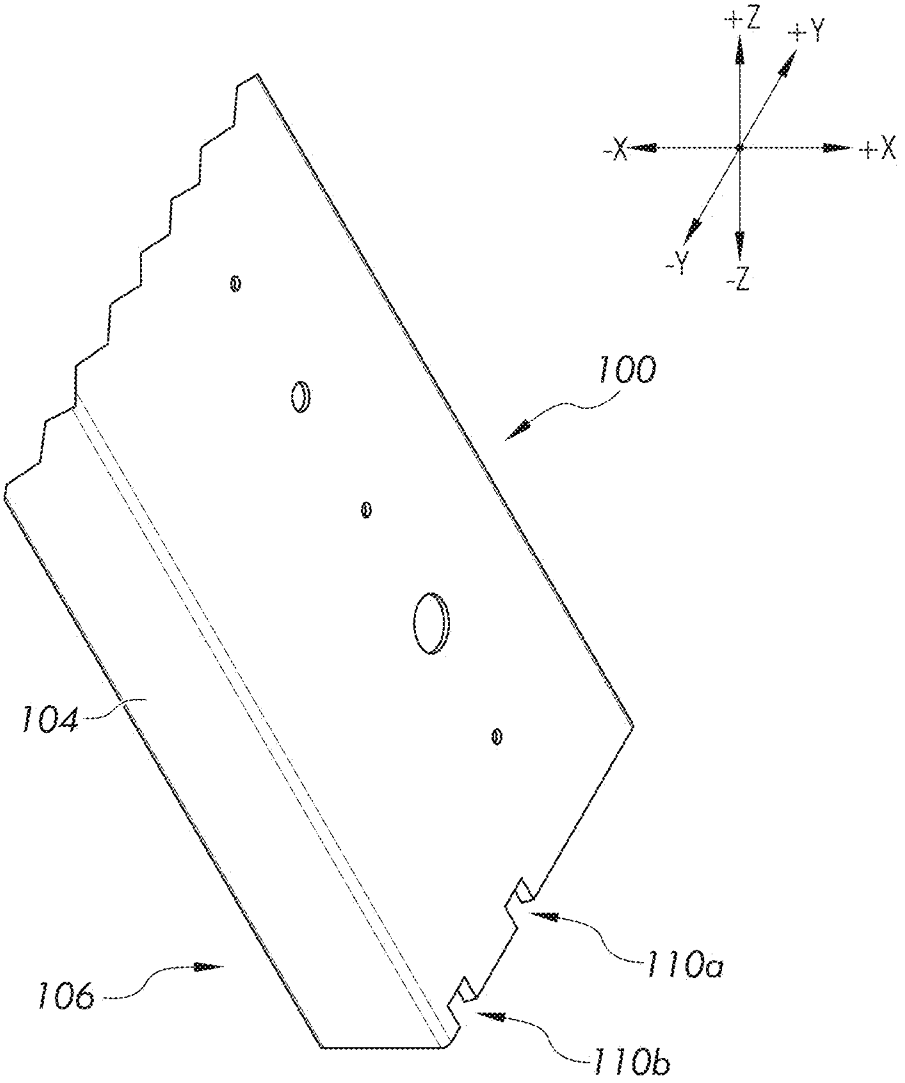
FIG. 2 depicts a perspective view of a portion of an illustrative frame assembly, according to one or more embodiments shown and described herein.
Figure 3:
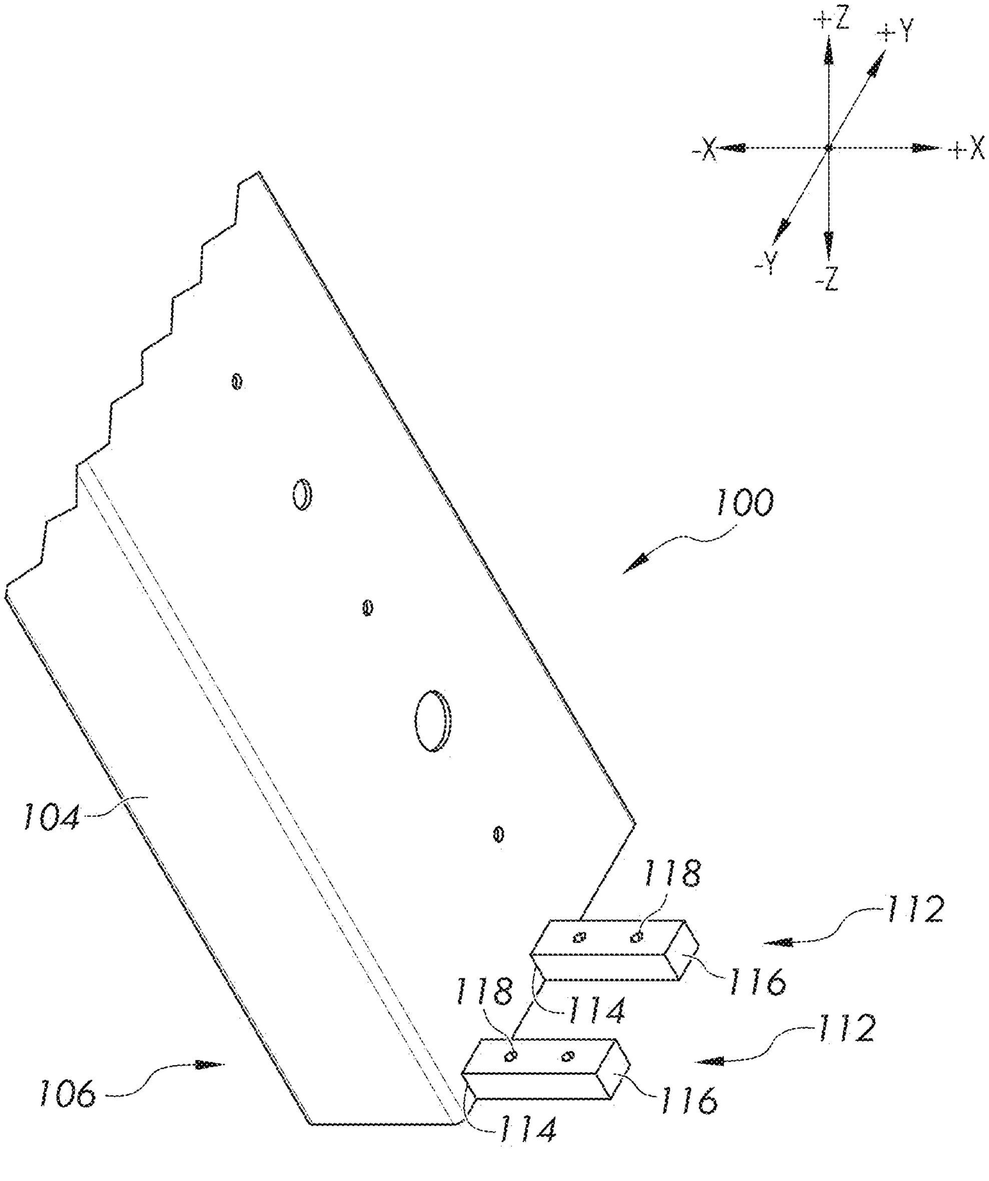
FIG. 3 depicts a perspective view of a portion of an illustrative frame assembly with additional components, according to one or more embodiments shown and described herein.

Referring to both FIGS. 2 and 3, the bottom end 106 of the jamb 104 is depicted in a perspective view. The bottom end 106 of the jamb 104 defines at least a central jacking block notch 110*a* and an outer jacking block notch 110*b*. Both the central jacking block notch 110*a* and the outer jacking block notch 110*b* are configured to receive a jacking block 112. There may be a plurality of jacking blocks 112 for a plurality of notches, and FIGS. 2, 3, and 4 do not limit the number of jacking blocks and notches for each jamb. Each jacking block 112 includes a jamb side 114 and door side 116. The jamb side 114 of each jacking block 112 is received within each of the central jacking block and outer jacking block notches 110*a* and 110*b*. The jacking blocks 112 may define jacking block holes 118 for receiving a fastening device such as, but not limited to, a screw or a bolt. Although FIGS. 2 and 3 depict only one jamb 104, the central jacking block and outer jacking block notches 110*a* and 110*b* and jacking blocks 112 are present at the bottom ends 106 of the jambs 104. It should also be understood that there may be more than two notches present at the bottom ends 106 of the jambs 104.

The jacking blocks 112 may be sized to be received within the central jacking block and outer jacking block notches 110*a* and 110*b*. That is, the jacking blocks 112 may be manufactured to be capable of fitting snugly within the central jacking block and outer jacking block notches 110*a* and 110*b* such that no additional cutting or shaping is necessary once the frame assembly 100 including the jambs 104 jacking blocks 112 are ready for installation. The jacking blocks 112 may be made of a metal alloy, a composite material, or other suitable material with the necessary mechanical properties to provide support for the threshold 150.

Figure 4:
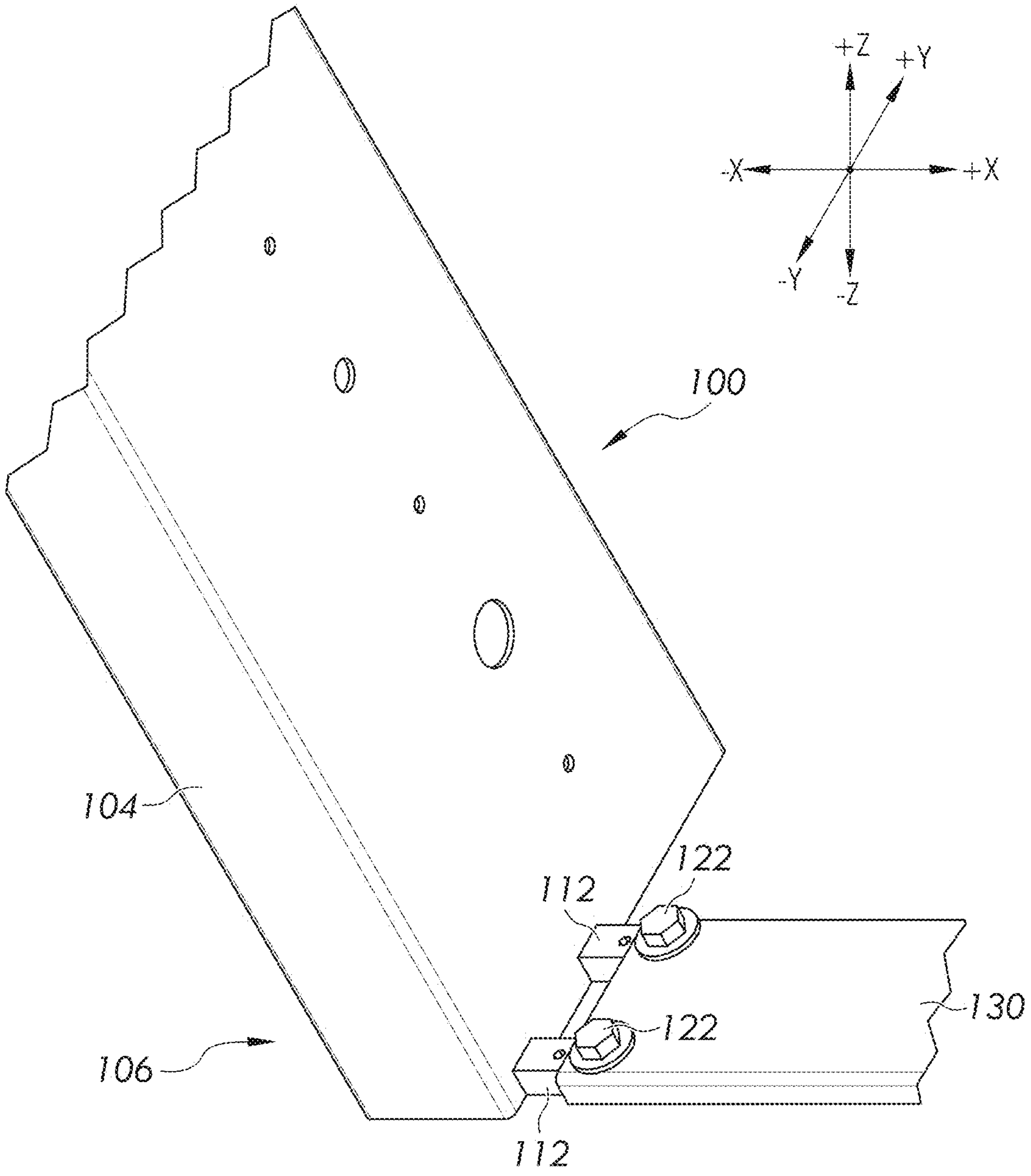
FIG. 4 depicts another perspective view of a portion of an illustrative frame assembly with additional components, according to one or more embodiments shown and described herein.

Now referring to FIG. 4, a temporary spreader bar 130 is coupled to the door side 116 (FIG. 3) of each jacking block 112 using a set of temporary spreader bar fasteners 122 through the jacking block holes 118 (FIG. 3). In embodiments, the temporary spreader bar 130 may be intended only for shipping and handling such that the temporary spreader bar 130 is removed prior to installing the threshold 150 and the seal retainer 140. Other fastening means may be used to couple the temporary spreader bar 130 to the jacking blocks 112, and this disclosure is not limited to the means depicted in FIG. 4. The temporary spreader bar 130 may be metal or other suitable material for providing support for the frame assembly 100 during transport.

Figure 5A:
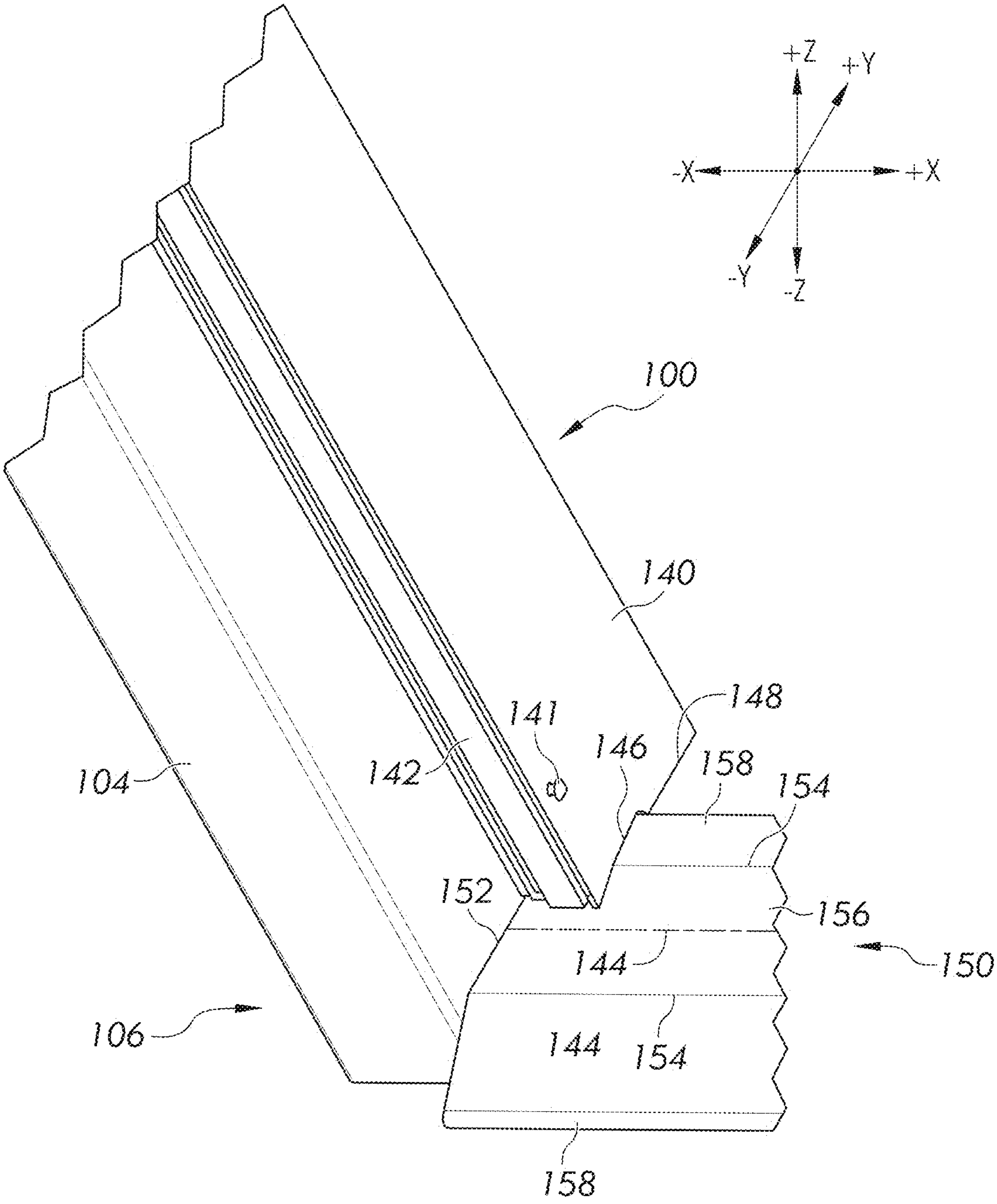
FIG. 5A depicts a perspective view of a portion of an illustrative frame assembly and threshold according to one or more embodiments shown and described herein.

Now referring to FIG. 5A, a seal retainer cover 140 is disposed above the threshold 150 along the vertical axis (Z axis). The seal retainer cover 140 may be removably coupled to the frame assembly 100 by fastening means, such as a screw 141, on one of the jambs 104. A threshold 150 defining a thickness is partially disposed below the seal retainer cover 140 along the vertical or Z axis. The threshold 150 includes a planar portion 156 aligned with the jambs 104 of the frame assembly 100.

The seal retainer cover 140 may be made from a single material or a plurality of materials. For example, the seal retainer cover 140 may be made from a sheet metal or any other suitable material with suitable mechanical properties and a limited thickness.

The threshold 150 may be made from a single material or a plurality of materials. For example, the threshold 150 may be made from a metal, a rigid plastic, a composite material, or any other suitable material with suitable mechanical properties to support the base of the frame assembly 100.

Figure 5B:
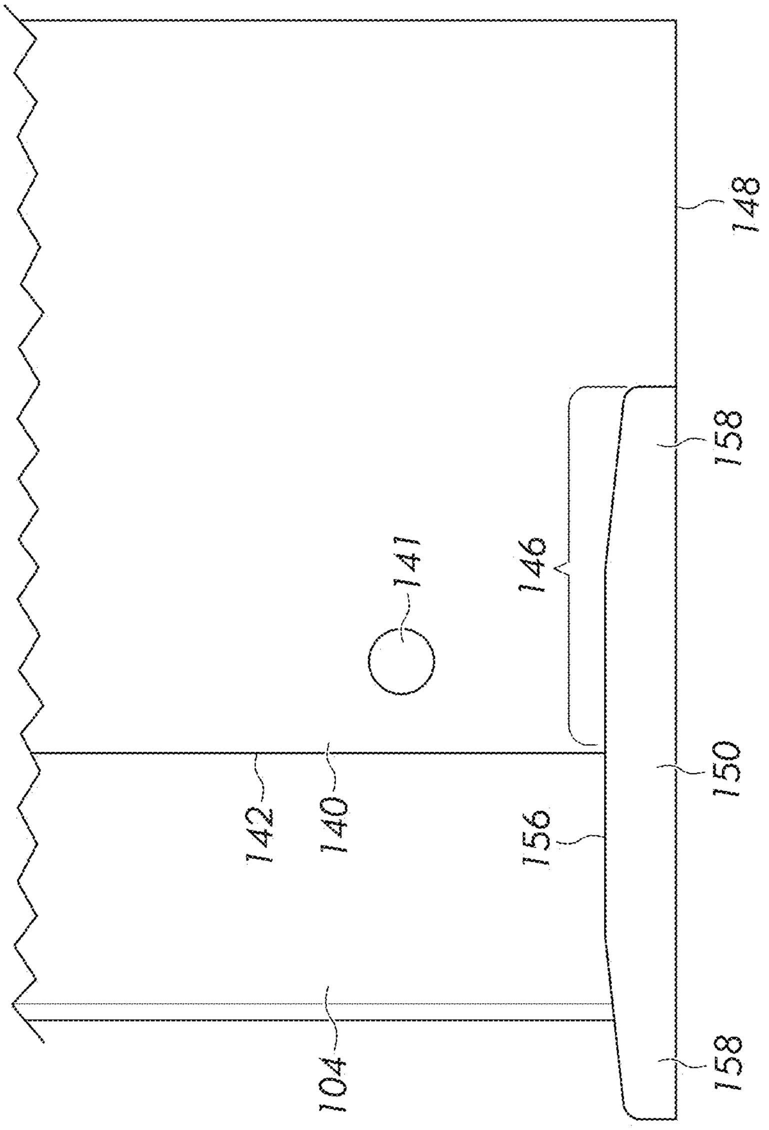
FIG. 5B depicts a side view of a portion of an illustrative frame assembly and threshold according to one or more embodiments shown and described herein.

Now referring to FIGS. 5A and 5B, the planar portion 156 of the threshold 150 includes two profile edges 152 and two threshold ramp bevels 154. Two ramp portions 158 extend from the two threshold ramp bevels 154 of the planar portion 156 to a floor. The planar portion 156 may be the same width as the thickness of the door (not shown), or the planar portion 156 may be wider or narrower than the thickness of the door. The planar portion 156 of the threshold 150 is partially disposed below the seal retainer cover 140 along the vertical or Z axis. The seal retainer cover 140 may be positioned such that an acoustical sound seal 142 extends above the planar portion 156 of the threshold 150 on or about the centerline 144. The seal retainer cover 140 may include a threshold notch 146 that aligns with the ramp portion 158 over which the seal retainer cover 140 extends. Once the ramp portion 158 ends, the threshold notch 146 terminates and a bottom edge 148 extends to the edge of the seal retainer cover 140.

The position of the threshold 150 between the seal retainer cover 140 and the floor is such that the seal retainer cover 140 and the plurality of jacking blocks 112 restrict a lateral movement of the threshold 150. That is, the threshold 150 may be held in place by the seal retainer cover 140 and the plurality of jacking blocks 112 such that the threshold 150 is able to fit between the jambs 104 as intended. In this way, the threshold 150 is unable to shift such that the threshold 150 would be out of alignment with the jambs 104 or any other part of the frame assembly 100. It is contemplated that the plurality of jacking blocks 112 and the temporary spreader bar 130 may be shipped in an assembled configuration, as in FIG. 4, to prevent movement during shipping such that the installer could remove the assembly from the shipping crate and install the door with predetermined dimensions without any shimming or cutting. It is also contemplated that the seal retainer cover 140, the plurality of jacking blocks 112, the temporary spreader bar 130, and the threshold 150 may be assembled after shipping and before installation to ensure threshold alignment during installation. The threshold 150, frame assembly 100, and door (FIG. 6), will be capable of forming a sound-proof seal around the perimeter of the door when the door is closed.

Figure 6:
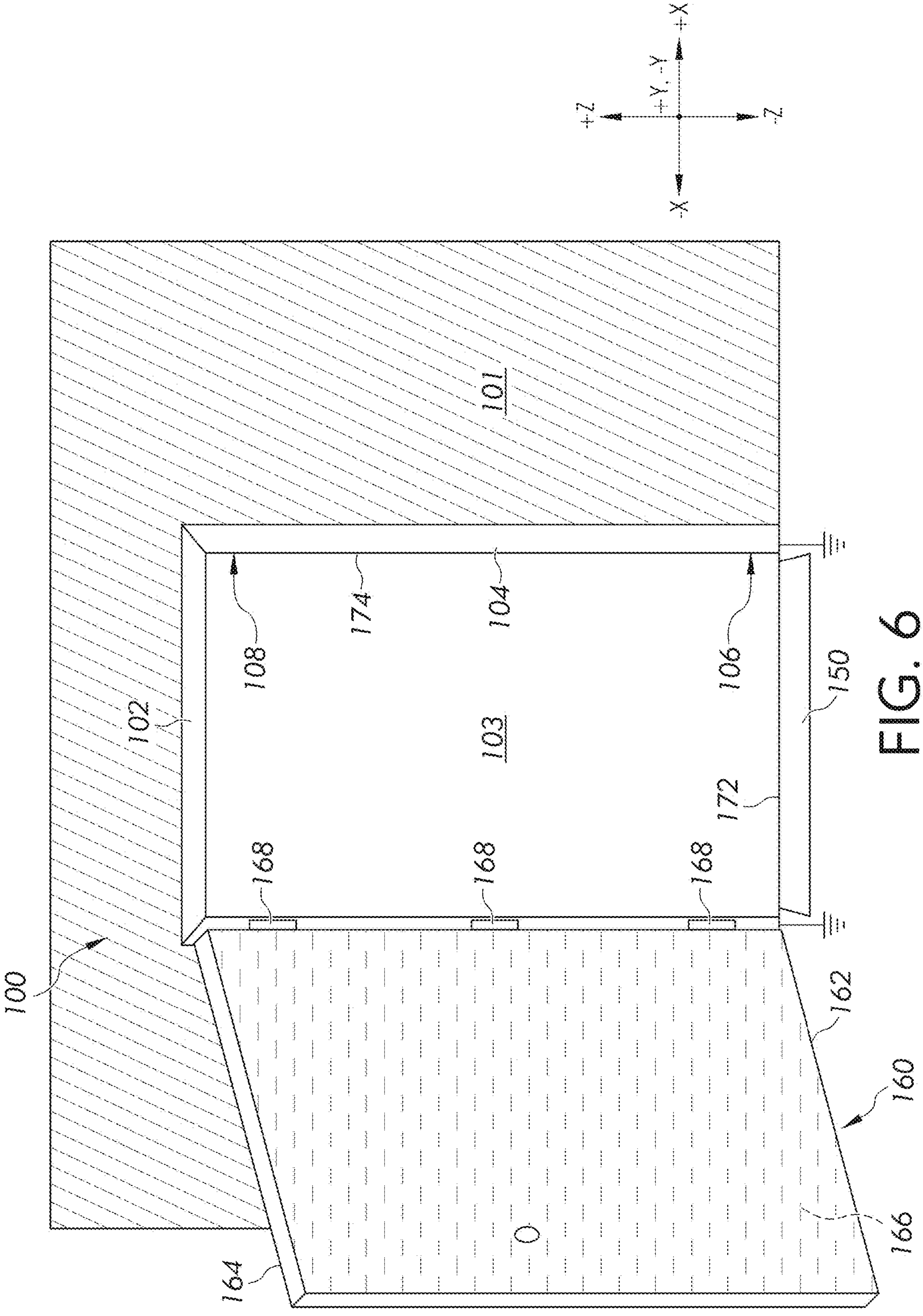
FIG. 6 depicts a plan view of an illustrative grounded frame assembly and door coupled to a wall within a rough opening of the wall, according to one or more embodiments shown and described herein.

Now referring to FIG. 6, a frame assembly 100 is depicted for RF shielding applications. The frame assembly 100 is coupled to the wall 101 within the rough opening 103 of the wall 101. A door 160 is hingedly coupled to one of the jambs 104 with hinges 168. The door 160 may include an inner surface 162 and an outer surface 164, wherein the outer surface 164 is opposite the inner surface 162. In embodiments, here may be at least one layer 166 of a sound-absorbing material disposed between the inner surface 162 and the outer surface 164. In embodiments, the door 160 may have a plurality of layers of a sound-absorbing material between the inner surface 162 and the outer surface 164. In embodiments, the door 160 may comprise an insulated core. As used herein, a door with an insulated core is a type of door that is constructed with an exterior sheet metal skin and packed with a sound-absorbing material, such as an insulating material, rather than being hollow or having a lightweight filler.

The sound-absorbing material within the at least one layer 166 between the inner surface 162 and the outer surface 164 may be mineral wool, fiberglass, polystyrene, polyurethane, perlite, cellulose, foam, or any other suitable insulating material capable of absorbing sound waves.

The at least one layer 166 may allow the door 160 to have a transmission loss (TL) of from 30 dB to 60 dB. As used herein, "transmission loss" or "TL" refers to the effectiveness of a door's ability to reduce noise. TL is measured herein using decibels, which is determined by measuring sound pressure levels at a certain frequency in the source and receiving rooms. The door is disposed between the source room and the receiving room, installed as described herein, and is closed, latched, or otherwise shut when the TL is measured. The adjusted difference between the two levels (e.g., the source room minus the receiving room) is the TL of the door. The higher the TL, the more effective the door is at sound-proofing. In embodiments, the TL of the door 160 may be greater than or equal to 30 dB and less than or equal to 60 dB. In embodiments, the TL of the door 160 may be greater than or equal to 35 dB, greater than or equal to 40 dB, or even greater than or equal to 45 dB. In embodiments, the TL of the door 160 may be less than or equal to 60 dB, less than or equal to 55 dB, or even less than or equal to 50 dB. It should be understood that the TL of the door 160 may comprise any of the endpoints discussed herein.

In embodiments where the application is an RF door, there may be an electrically conductive seal 172 between the door 160 and the threshold 150. The frame assembly 100 may also include an electrically conductive seal 174 between the jambs 104, the frame header 102, and the door 160. The electrically conductive seal 174 may be disposed on the frame header 102 and jambs 104 or on the door 160, such as on the inner surface 162 or the outer surface 164. These electrically conductive seals 172 and 174 are disposed such that electromagnetic fields may be blocked, including radio waves and microwaves, from penetrating or escaping interior of the wall 101 when the door is closed. As mentioned herein, electrically conductive materials may reflect and scatter electrical signals to prevent penetration. A frame assembly with electrically conducive seals, such as the one depicted in FIG. 6, may create a Faraday cage effect. A Faraday cage is a shielded enclosure made of conductive material that blocks external electromagnetic fields from entering and internal fields from escaping. The door assembly in FIG. 6 may be at least one means of ingress and egress of a Faraday cage and should be understood to shield the interior wall from radio frequency interference when the door is closed.

There are many reasons an RF door may be part of a Faraday cage, such as electromagnetic interference (EMI) shielding, security, regulatory compliance, RF shielded rooms, or other safety concerns. For example, laboratories, hospitals, or data centers using an RF door may help prevent electromagnetic interference from entering or leaving the room, which may be important for maintaining the integrity of experiments, medical equipment, or data transmission. In facilities where secure communication is essential, such as government buildings, research facilities, or military installations, RF doors within Faraday cages can prevent eavesdropping or signal interception. Industries such as healthcare or telecommunications may be subject to regulations regarding EMI shielding or radio frequency interference (RFI). Additionally, in environments where radio frequency energy poses a safety hazard, such as facilities handling high-power RF equipment or industrial settings with RF heating processes, RF doors with electrically conductive seals can help contain the radiation and protect personnel from exposure.

The doors described herein may have RFI shielding of 60 dB from 9 kHz to 18 GHz. This means that the door is capable of attenuating electromagnetic signals across the frequency range of 9 kHz to 18 GHz by 60 decibels when the door is installed and closed as described herein. Said differently, if an external signal is attempting to pass through a door with the above RFI shielding capabilities, the strength of the external signal will be reduced by 60 dB by the time it reaches the other side. This level of shielding significantly reduces the transmission of radio frequency signals, making it suitable for environments where EMI must be minimized, such as laboratories, data centers, or secure facilities. In embodiments, the RFI shielding of the door 160 may be less than or equal to 40 dB from 9 kHz to 18 GHz.

The electrically conductive seals 172 and 174 may be the same material or different materials. The electrically conductive seals 172 and 174 may be made from conductive metal fingerstock, conductive fabric over foam, or conductive elastomers.

In addition to electrically conducive seals 172 and 174, the frame assembly 100 may be electrically grounded via at least one cable coupled to each jamb 104. Still referring to FIG. 6, grounding the frame assembly 100 in an RF door may aid in dissipating any excess electrical charge and ensures that the door 160 functions effectively as a barrier against EMI by providing a path for the dissipation of electromagnetic energy. This may be achieved by grounding the two jambs 104, as depicted in FIG. 6. Grounding the frame assembly 100 may involve connecting the frame assembly 100 to a grounding system, such as a grounding rod or a building's electrical grounding grid. This connection is established using conductive materials, such as copper wires or metal strips, which are securely attached to both the frame assembly 100 and the grounding system. The grounding system itself is designed to safely dissipate electrical charges into the ground, thereby neutralizing any potential difference between the frame assembly 100 and its surroundings.

Figure 7:
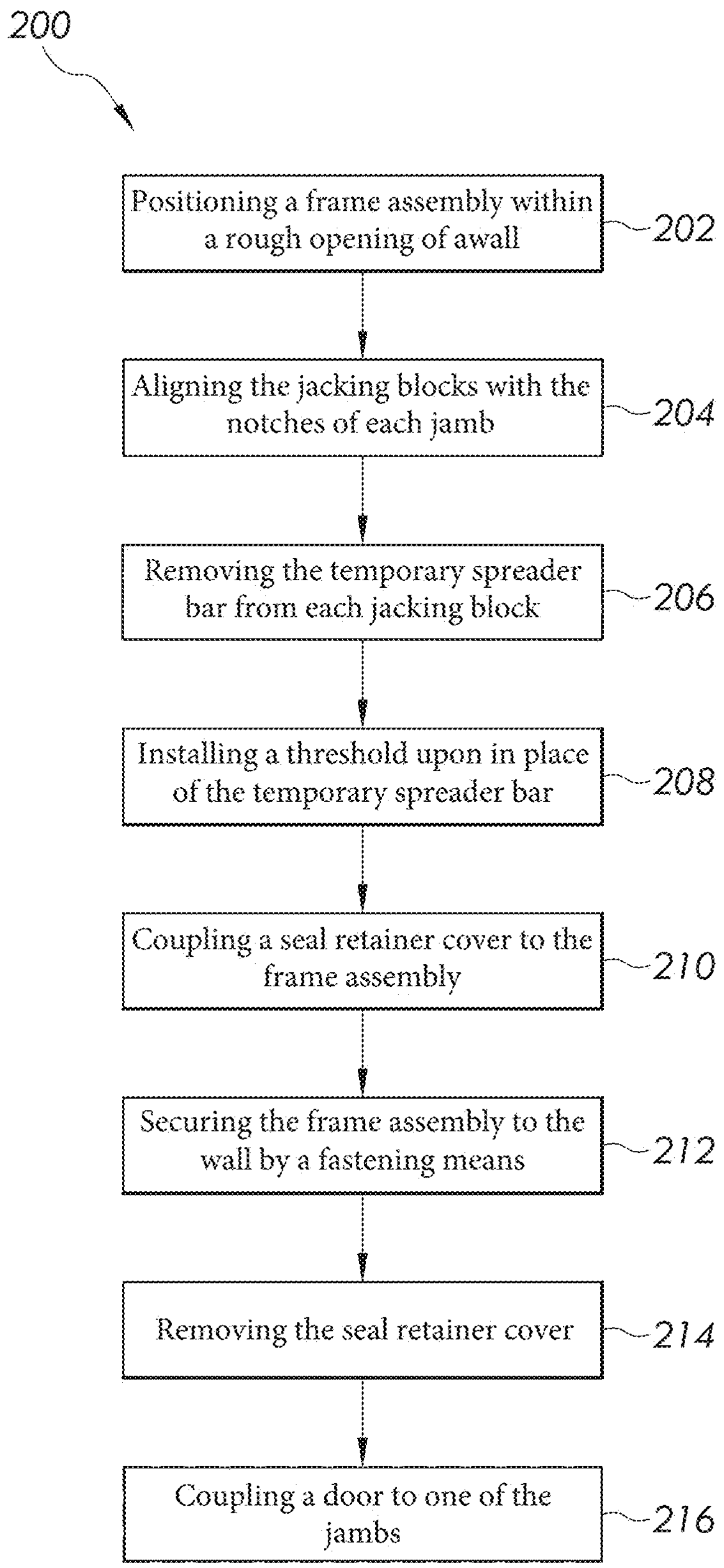
FIG. 7 depicts a flow diagram of an illustrative method of installing a door assembly according to one or more embodiments shown and described herein.

FIG. 7 depicts a flowchart of an example method 200 of installing a door assembly. At block 202, the frame assembly 100, including the frame header 102 and jambs 104, is positioned within the rough opening 103 of the wall 101. In embodiments, the frame assembly 100 may be shipped with the jacking blocks 112 attached to the temporary spreader bar 130 and within the central jacking block and outer jacking block notches 110*a* and 110*b*. At block 204, the jacking blocks 112 coupled to a temporary spreader bar 130 are aligned with the notches 110*a* and 110*b* of each jamb 104 to ensure that the frame assembly 100 is level. At block 206, the temporary spreader bar 130 is removed from each jacking block 112.

At block 208, the threshold 150 is installed by fitting the threshold 150 between the two jambs 104 in place of the removed temporary spreader bar 130. At block 210, the seal retainer cover 140 is removably coupled to the frame assembly 100 on one jamb. The seal retainer cover 140 sits flush against the threshold 150 with the threshold notch 146 aligned with the ramp portion 158. This step allows the threshold 150 to stay in place at block 212 during installation. At block 212, the frame assembly 100 is secured to the wall 101 by a fastening means. At block 214, the seal retainer cover can be removably uncoupled from the frame assembly 100. At block 216, the door 160 is hingedly coupled to the frame assembly 100. In embodiments, where the door 160 is an RF door, the method 200 may include electrically grounding the jambs 104 may be electrically grounded and the electrically conductive seals 172 and 174 may be installed along the threshold 150 and door 160 or frame assembly 100.

In view of the above, it should now be understood that at least some embodiments of the present disclosure are directed to a door assembly installed in applications where SCIF or RF shielding may be concerns. The door assembly includes a frame assembly with two jambs and a frame header. Each jamb includes a top end and a bottom end, and the frame header is coupled to the two jambs at each of the top ends thereof. Each jamb defines at least a central jacking block notch and an outer jacking block notch at each of the bottom ends. The door assembly further includes a plurality of jacking blocks, and each jacking block comprises a jamb side and a door side opposite the jamb side. The jamb side of each jacking block is received within each of the central and outer jacking block notches. The door assembly further includes a temporary spreader bar coupled to the door side of each jacking block, a seal retainer cover disposed above the temporary spreader bar in a vertical direction, and a threshold defining a thickness. The threshold is partially disposed below the seal retainer cover along the vertical or Z axis, and the seal retainer cover is removably coupled to the frame assembly such that the seal retainer cover and the plurality of jacking blocks restrict a lateral movement of the threshold. The door assembly also includes a door hingedly coupled to one of the jambs. The threshold and frame assembly form a sound-proof seal around the perimeter of the door when the door is closed.

It is noted that the term "about" may be utilized herein to represent the inherent degree of uncertainty that may be attributed to any quantitative comparison, value, measurement, or other representation. These term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A door assembly, comprising:
- a frame assembly comprising two jambs and a frame header, each jamb comprising a top end and a bottom end, wherein the frame header is coupled to the two jambs at each of the top ends thereof, and wherein each jamb defines at least a central jacking block notch and outer jacking block notch at each of the bottom ends;
- a plurality of jacking blocks, each jacking block comprising a jamb side and a door side opposite the jamb side, wherein the jamb side of each jacking block is received within each of the central and outer jacking block notches;
- a temporary spreader bar coupled to the door side of each jacking block;
- a seal retainer cover removably coupled to one of the jambs;
- a threshold defining a thickness, wherein the threshold is partially disposed below the seal retainer cover along a vertical axis; and
- a door hingedly coupled to one of the jambs,
- wherein the seal retainer cover is removably coupled to the frame assembly such that the seal retainer cover and the plurality of jacking blocks restrict a lateral movement of the threshold.

2. The door assembly of claim 1, wherein the threshold comprises:
- a planar portion aligned with the jambs of the frame assembly, the planar portion comprising two profile edges and two ramp bevels; and
- two ramp portions extending from the two ramp bevel of the planar portion to a floor.

3. The door assembly of claim 2, wherein the planar portion of the threshold is disposed below the seal retainer cover along the vertical axis.

4. The door assembly of claim 1, wherein the door comprises:

an inner surface and an outer surface, wherein the outer surface is opposite the inner surface; and at least one layer of a sound-absorbing material disposed between the inner surface and the outer surface.

5. The door assembly of claim 4, wherein the at least one layer of the sound-absorbing material is selected from the group consisting of: mineral wool, fiberglass, polystyrene, polyurethane, perlite, cellulose, or foam.

6. The door assembly of claim 1, wherein the door comprises an insulated core.

7. The door assembly of claim 1, wherein the door assembly has a transmission loss (TL) of from 30 dB to 60 dB.

8. The door assembly of claim 1, wherein each jamb is grounded via at least one cable coupled to each jamb.

9. The door assembly of claim 1, wherein an electrically conductive seal is disposed between the frame assembly and the door.

10. The door assembly of claim 1, wherein an electrically conductive seal is disposed between the threshold and the door.

11. The door assembly of claim 1, wherein:

each jamb is grounded via at least one cable coupled to each jamb;

a first electrically conductive seal is disposed between the frame assembly and the door; and a second electrically conductive seal is disposed between the threshold and the door.

12. The door assembly of claim 11, wherein the door assembly has a radio frequency interference (RFI) shielding of 60 dB of from 9 kHz to 18 GHz.

13. The door assembly of claim 11, wherein the first and second electrically conductive seals comprise materials from the group consisting of: conductive metal fingerstock, conductive fabric over foam, and conductive elastomers.

14. The door assembly of claim 11, wherein the first and second electrically conductive seals are disposed on an inner surface of the door or an outer surface of the door.

15. A door assembly, comprising:

a frame assembly comprising two jambs and a frame header, each jamb comprising a top end and a bottom end, wherein the frame header is coupled to the two jambs at each of the top ends thereof, and wherein each jamb defines at least a central jacking block notch and outer jacking block notch at each of the bottom ends;

a plurality of jacking blocks, wherein each jacking block comprises a jamb side and a door side opposite the jamb side, wherein the jamb side of each jacking block is received within each of the notches;

a temporary spreader bar coupled to the door side of each jacking block;

a seal retainer cover removably coupled to one of the jambs;

a threshold defining a thickness, wherein the threshold is partially disposed below the seal retainer cover along a vertical axis; and a door hingedly coupled to one of the jambs, wherein the seal retainer cover is removably coupled to the frame assembly such that the seal retainer cover and the plurality of jacking blocks restrict a lateral movement of the threshold, and wherein each jamb is grounded via a cable coupled to the jamb, wherein the door assembly shields an enclosure from radio frequency interference when the door is closed; and wherein the door is disposed on the enclosure to allow ingress and egress from the enclosure.

16. The door assembly of claim 15, wherein:

a first electrically conductive seal is disposed between the frame assembly and the door; and a second electrically conductive seal is disposed between the threshold and the door.

17. The door assembly of claim 16, wherein the door assembly has a radio frequency interference (RFI) shielding of 60 dB of from 9 kHz to 18 GHz.

18. A method of installing a sound-proof door assembly, comprising:

positioning a frame assembly within a rough opening of a wall, the frame assembly comprising:

two jambs each comprising a top end and a bottom end;

a frame header, wherein the frame header is coupled to the two jambs at each of the top ends thereof, and wherein each jamb defines at least a central jacking block notch and an outer jacking block notch at each of the bottom ends;

aligning a plurality of jacking blocks coupled to a temporary spreader bar with the notches of each jamb, each jacking block comprising:

a jamb side; and a door side opposite the jamb side, wherein the jamb side of each jacking block is received within each of the notches;

removing the temporary spreader bar from each jacking block;

installing a threshold in place of the temporary spreader bar;

coupling a seal retainer cover to the frame assembly such that the threshold is partially disposed below the seal retainer cover along a vertical axis such that the seal retainer cover and the plurality of jacking blocks restrict a lateral movement of the threshold;

securing the frame assembly to the wall by a fastening means;

removing the seal retainer cover; and hingedly coupling a door to one of the jambs.

19. The method of claim 18, further comprising closing the door such that the threshold and frame assembly form a sound-proof seal around a perimeter of the door when the door is closed.

20. The method claim 19, further comprising:

electrically grounding each jamb; and sealing space between the frame assembly and the door with electrically conductive material; and sealing space between the threshold and the door with electrically conductive material, such that the door assembly shields an enclosure from radio frequency interference when the door is closed.

* * * * *